Aug. 16, 1960  A. FOURES  2,949,071
ENDOSCOPIC CAMERA SYSTEM
Filed March 12, 1957  4 Sheets-Sheet 3
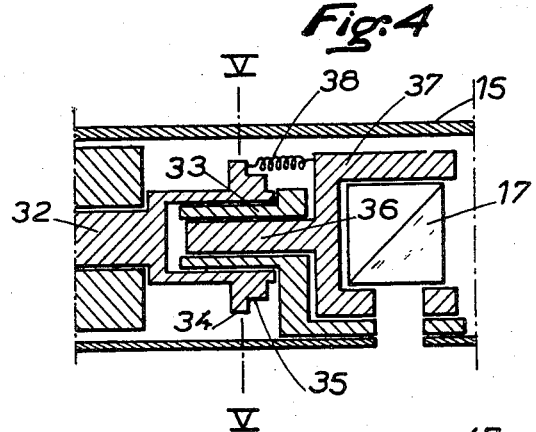
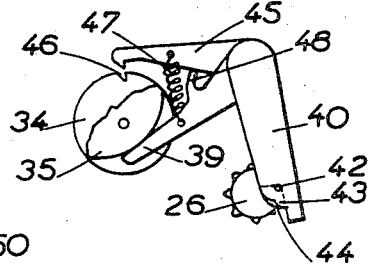
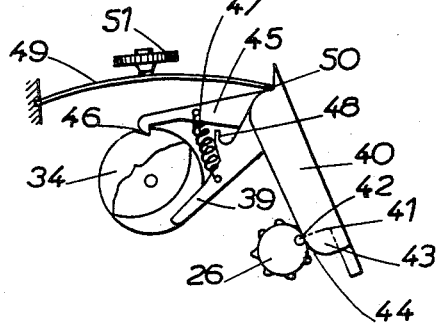
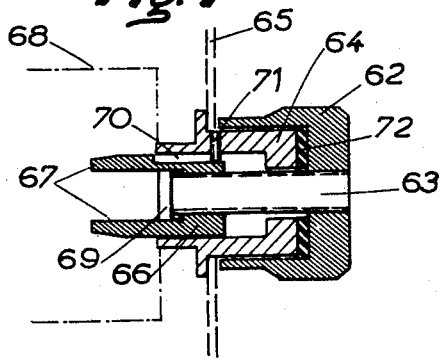
Andre Foures
INVENTOR
By: Mead, Browne, Schuyler & Beveridge
ATTORNEYS Aug. 16, 1960  A. FOURES  2,949,071
ENDOSCOPIC CAMERA SYSTEM
Filed March 12, 1957  4 Sheets-Sheet 4
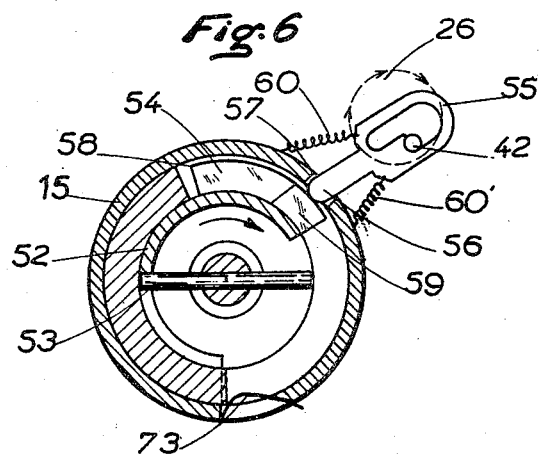
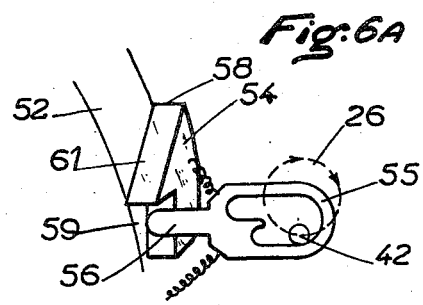
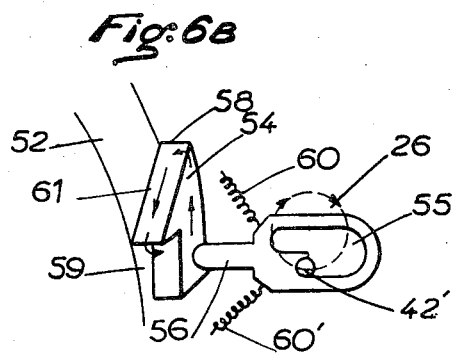
Andre Foures
INVENTOR
By: Mead, Browne, Schuyler & Beveridge
ATTORNEYS

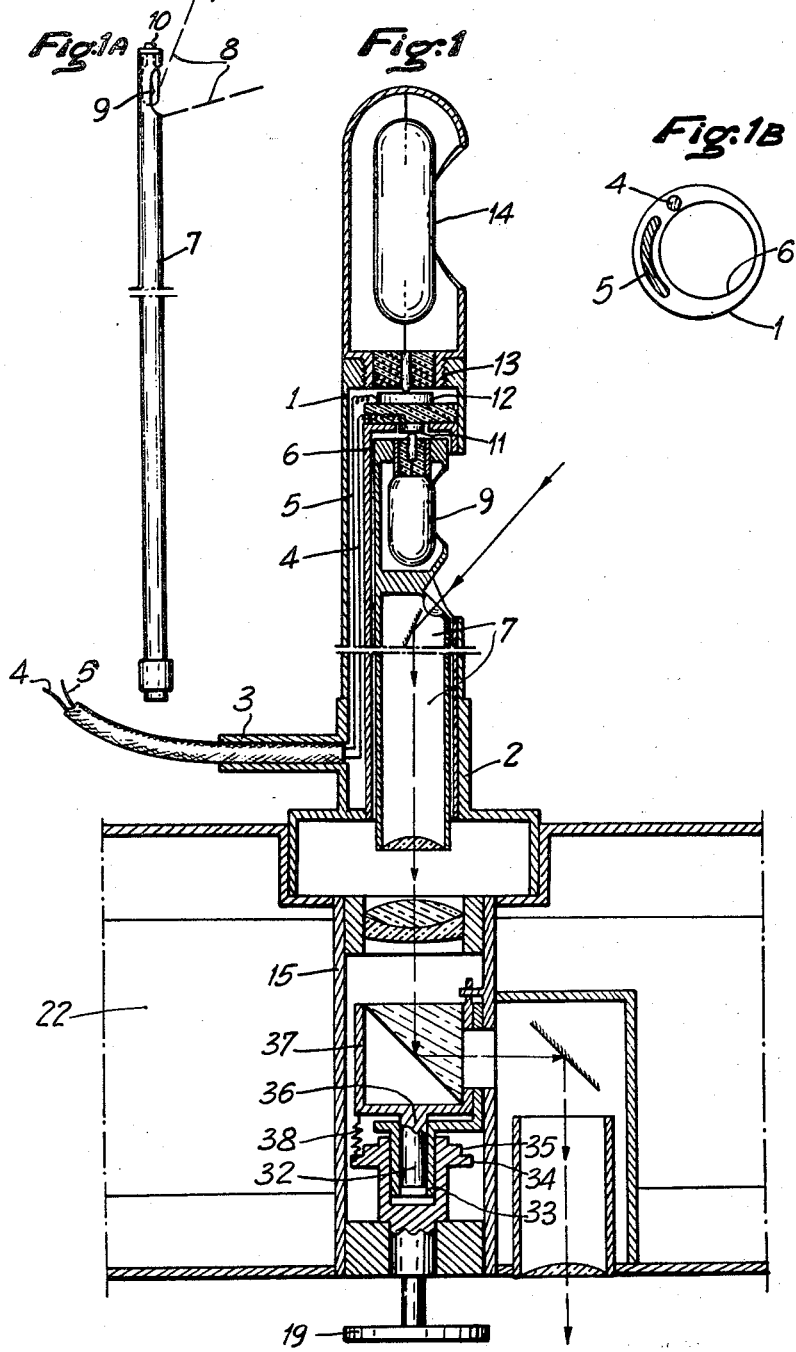

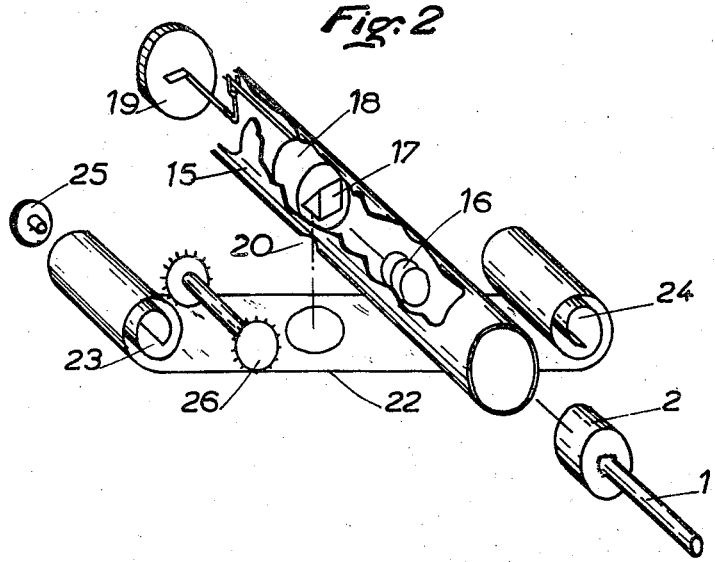
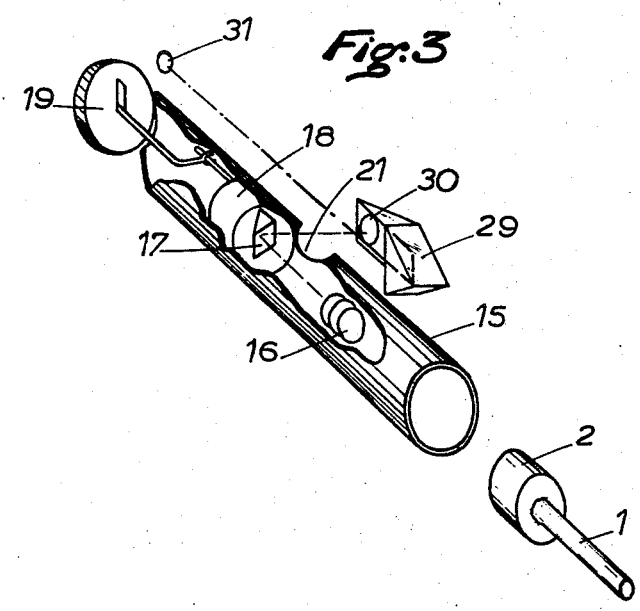

United States Patent Office 2,949,071
Patented Aug. 16, 1960

2,949,071

ENDOSCOPIC CAMERA SYSTEM

André Foures, 11 rue Margueritte, Paris, France

Filed Mar. 12, 1957, Ser. No. 645,437

Claims priority, application France Mar. 19, 1956

6 Claims. (Cl. 95—11)

My invention has for its object a camera system for taking endoscopic photographs, i.e. an apparatus which allows photographing the inside of recesses which can be only reached through an opening having a small diameter.

This apparatus is applicable in particular for medical purposes, for photographing for instance the peritoneal cavity in the human body.

My improved apparatus allows obtaining photographs, in particular color photographs, through illumination by means of an electronic discharge tube while using a single opening for the introduction of the apparatus into the body. My improved apparatus includes two sections, on the one hand, a section including the elements to be introduced into the recess or cavity, i.e. the endoscope and the illuminating means and on the other hand the view-taking section remaining outside the body and including in particular the actual camera.

My invention has more particularly for its object various improvements brought to the endoscopic and illuminating section and also to the actual photographic section of the apparatus.

As concerns the endoscopic section, it allows producing an arrangement the diameter of which is as small as possible and to this end it includes for instance two metal tubes fitted inside each other and inwardly tangent to each other; the outer diameter of the inner tube is slightly smaller than the inner diameter of the outer tube so as to provide between the two tubes a slight gap which allows the current feeding wire to pass through said gap so as to feed on the one hand the electronic flashlight and on the other a small test or examination bulb, the flashlight and the bulb being housed in sequence at the end of said tube; the metal sheath of the electronic flash light is screwed into the end of the outer tube while one of the current feeding wires is electrically connected with the electronic flash light through this screwing of the metal tube over the latter. Preferably, the lead feeding the electronic flash light has a flattened shape so that it may be possible to increase its cross-section, in spite of the reduced breadth of the space available for it between the two metal tubes. The test or examination bulb may be positioned inside the inner tube and carry a contact-piece which engages when the test bulb is mounted, the second wire feeding current, the return of the circuits feeding the electronic flash light and bulb being provided through the mass of the apparatus. The inner metal tube contains an optical system known per se which provides in particular a sighting field arranged obliquely.

As to the view taking apparatus is concerned in which preferably a standard film of 35 millimeters is used, it includes a camera obscura inside which the film is wound and unwound in accordance with conventional methods while the beam produced by the objective is reflected inside said camera obscura preferably at 90° through a reflecting system such as a prism, a mirror or the like, whereby the plane of the image is shifted away from the optical axis of the endoscope preferably into parallelism with said optical axis, which allows in particular reducing the bulk of the apparatus. In addition to the camera obscura, there is provided a finder incorporating part of the optical system of the instrument up to the reflecting surface, means being provided for rocking said reflecting member and allowing when it is desired to take a view to shift the optic system from its operative connection with the finder into operative connection with the camera. The optical axis of the finder is preferably parallel with the optical axis of the endoscope and at a small distance from said axis, which is made possible through the fact that, for view-taking the image is reflected laterally by the prism.

The photographs are taken preferably under open flash conditions, i.e. the flash light is released while the apparatus is held open and the objective is adjusted for a constant distance defined by the optical data of the apparatus, the latter including furthermore the conventional objective adjusting means. Safety means are preferably also provided so as to prevent in particular the superposition of two successive pictures.

The above arrangements are designed in accordance with my invention in a manner such that the flash light cannot be produced until the reflecting member has been completely rocked so as to be brought into view-taking position. Furthermore, when a view has been taken the flash light cannot be released any more until the film has been shifted forwardly by the distance corresponding to the spacing required between two successive exposures.

Further objects and features of my invention will appear in the reading of the following description, reference being made to the accompanying drawings illustrating diagrammatically and by way of non-limiting examples various embodiments of my invention. In said drawings:

Figs. 1, 1A, 1B are sectional views of the endoscope: Fig. 1 is a longitudinal sectional view of the illuminating means for the instrument. Fig. 1A a longitudinal sectional view of the optical system housed inside the illuminating means, Fig. 1B a cross-section on a much larger scale through line I—I of Fig. 1.

Fig. 2 is a perspective view of the camera mechanism after removal of the enclosing case for sake of a better showing. The camera case may in fact be given any suitable or desired shape.

Fig. 3 is a similar partly broken off perspective view of the optical system of the camera in association with the finder of which only the optical elements have been illustrated.

Fig. 4 is a longitudinal cross-section on a larger scale of the tube containing the objective and the reflecting surface, said figure showing in particular the manner of fitting the reflecting surface.

Figs. 5, 5A, 6, 6A, 6B and 7 illustrate various details of my improved apparatus.

Turning to Figs. 1, 1A, 1B, 1 designates the outer metal tube of the actual endoscopic instrucent, said tube having for instance a diameter of 6.5 millimeters and a length of about 30 centimeters so, as to allow examining and photographing for instance the inside of the peritoneal cavity of a patient. Said outer metal tube is carried at its outer end by a cylindrical member 2 connecting it with the actual camera, said member including a lateral input pipe 3 through which pass the current-feeding wires 4 and 5 which serve for feeding as disclosed hereinafter on the one hand the electronic tube 14 and on the other hand the examination bulb, the return of the current being provided through the metal mass of the tube 1. Inside said tube 1 is housed a second tube 6 containing the optical system 7 illustrated diagrammatically in and the outer diameter of which is slightly smaller than the inner diameter of the tube 1 (see in particular the cross-section in Fig. 3) so as to allow the passage of the wires 4 and 5 through the gap between the two tubes. The wire 5 feeding the electronic tube is flattened as clearly shown in Fig. 1B so as to reduce its thickness and to allow its convenient housing inside said gap while retaining a sufficient cross-section.

The optical system 7, of a type well known per se for the transmission of the images, provides an oblique field of vision shown diagrammatically at 8 in Fig. 1A or else it may provide a field of vision at 90°. Said optical system carries at its end in accordance with a further feature of my invention a small lamp 9 for illumination purposes when it is desired to examine the patient with one's eye. Said examination lamp 9 carries a contact piece 10, adapted when the optical system 7 is introduced inside the tube 6 through its outer end to engage electrically at 11 the corresponding wire 4, elastic means which are not illustrated providing for permanency of the contact thus provided. Furthermore, the tube 1 carries at its end a contact-piece 12 connected with the wire 5 and over which is screwed one of the terminals 13 of the flash-like tube 14, the different elements which have just been described forming a readily mounted and disconnectable unit. For sake of clarity, the flash light tube 14 is shown only in Fig. 1 and the illuminating bulb or the lamp 9 in Fig. 1A, their relative position appearing clearly from the comparison between the two figures arranged side by side.

For examination purposes, the endoscope is introduced at the desired location in a conventional manner, the wire 4 feeding the lamp 9 to allow examination by one's eye of the part it is desired to photograph. When the apparatus is in a position corresponding to view-taking as will be readily ascertained through the lamp 9, the flashlight 14 is illuminated so as to operate at the same time as the camera mechanism, as will be disclosed hereinafter, so as to photograph the desired part of the cavity inside which the endoscope is positioned.

I will now describe roughly the actual view-taking camera, reference being made more particularly to Figs. 2 and 3. In said figures, the cylindrical member 2 carrying the endoscopic tube is assembled coaxially with a further tube 15 forming an extension of the inner section of the endoscopic tube 5; said tube 15 encloses the optic system 7 including the objective 16 and a reflecting surface or prism 17 carried in its turn by a rotary carrier tube 18 controlled by a knob 19 through the agency of a transmission to be described hereinafter; said knob allows rocking the prism 17 through an angle of 90° so as to direct the luminous beam alternatingly either onto the finder or onto the sensitive film. In Fig. 2, the luminous beam is directed towards the sensitive film while in Fig. 3, it is shown as directed towards the finder.

The tube 15 is provided with corresponding apertures 20 and 21 as shown respectively in Figs. 2 and 3 for the passage of the luminous beam perpendicularly onto the film and onto the finder as the case may be. In Fig. 2 it is apparent that the luminous beam is projected onto the film 22, the ends 23 and 24 of which are wound over drums in the usual manner while the progression of the film is executed as known per se by means of a knurled knob 25, said progression driving a drum 26 provided with film-engaging pins and connected with the prism controlling means through the arrangement referred to hereinabove, which will be described hereinafter in full detail.

When the prism has been rocked through 90°, it sends the image onto the finder which is arranged in parallelism with the endoscope and carries a beam shifting prism 29 of a well-known type, which carries at its front end a convergent lens 30 projecting the luminous beam onto the eye piece 31 of the finder behind which the practitioner puts his eye. The fittings for these optical elements have not been illustrated for sake of clarity.

The axis of the finder is parallel with the axis of the endoscope and is brought as near the latter as possible so as to further the examination of the cavity and this is made possible through the fact that the camera and the film are positioned, in conformity with my invention, laterally with reference to and in parallelism with the main optical axis of the instrument.

I will now explain how the mechanical arrangement controls the rocking of the luminous beam passing out of the finder onto the film and the simultaneous release of the flash-light, while said arrangement incorporates the required safety mechanism which is to prevent any superposition of two pictures.

To this end and in accordance with my invention, there is provided between the means controlling the rotation of the prism, the means actuating the flash light, and the means providing for the progression of the film an interengaging system which ensures the proper sequence of the following operations.

(When the member or knob 19 producing the rotation of the prism is turned, said knob starts the rotation of the prism and brings it from the position of direct eye vision into the view taking position and it is only after reaching this last view taking position for which the prism stops that the continuation of the movement of said member releases the flash light while a return device shifts automatically the control member and the prism back into their original position for direct eye vision.

(The flash light having been thus released, it is impossible to turn the knob any further before the film has progressed in the manner disclosed to allow a further flash.

(The film driving knob being then actuated so as to bring the film into the following view taking position, it is impossible to act on it any more before the flash light has been released again.)

I have illustrated in Figs. 4, 5 and 5A a first embodiment of the control and releasing system together with details thereof.

Fig. 4 is as already mentioned, a large scale longitudinal cross-section through the axis of the carrier 15 already shown in Figures 2 and 3, while Figs. 5 and 5A are cross sections through line VV of Fig. 4, showing furthermore the interengaging means which are not illustrated in Fig. 4. These two Figures 5 and 5A show two different positions of said arrangement.

In said figure in which 15 designates as precedingly the tube containing the objective, the spindle 32 carrying the release knob 19 pivots round a hollow stationary spindle 33 rigid with the tube 15. Inside the hollow spindle 33 is revolubly mounted a further spindle 36 carrying the carrier 47 for the prism 17. The spindle 32 and the carrier 37 are furthermore interconnected through elastic means illustrated diagrammatically by a spring 38 so that when the spindle 32 is driven into rotation by the knob 19 the carrier 37 follows its movement until the prism has turned through 90° after which the movement of the prism is arrested by a stop 71 in a position corresponding to that for which the luminous beam is actually projected onto the film.

Due to the presence of the elastic means 38, it is possible to continue rotating the knob 19 and the spindle 32 even after the stopping of the prism and to bring thereby the spindle 32 into a position which is not illustrated and for which the switch 72 controlling the flash light is closed through the agency of means which are not illustrated; the flash light can therefore not be actuated before the prism has actually reached a suitable position for projection onto the film.

A spring 70 returns automatically the system including the knob and the prism into their starting position as soon as the knob is released after operation of the flash light.

On the other hand; the carrier spindle 32 is rigid with two cams 34 and 35. The cam 35 is provided with a projection which upon rotation raises a feeler 39 (Fig. 5) which is held in contact with said cam. Said feeler is rigid with a second feeler 40 provided with a notch 41 engaged by a stud 42 riveted to the lateral surface of the drum 26 carrying teeth engaging the film perforations. The engagement of the stud 42 at the bottom of the notch 41 has consequently for its result a locking of the progression of the film as clearly shown in Fig. 5. This actually occurs when, after view taking, the knob 25 is turned so as to shift the film into the position corresponding to the next exposure. During said exposure, the knob 19 is turned so as to bring the prism into its view taking position and to release the flash light. This rotary movement of the knob produces a rotation of the cam 35 so that the latter raises the first feeler 39; the first feeler shifts the second feeler and releases the stud 42 with reference to the drum 26. However when the return spring shifts the releasing knob 19 back which carries along with it the cam 35 in the opposite direction, the second feeler 40 has a tendency to return into its starting position and to lock again the stud 42 inside its notch. Now, it is necessary that at this moment the stud 42 may remain in its released position so as to allow a further progression of the film. To this end, there is secured to the second feeler 40 a spring blade 43 covering it entirely and the lower edge 44 of which is slightly raised so as to allow the stud 42 to raise and pass underneath said edge when said stud abuts against the notch 41 during the rotation of the drum driven by the progression of the film; when, in contradistinction, the feeler 40 is shifted away from such a position at the moment of the taking of a view, the spring blade 43 returns onto the surface of the film and engages through its edge 44 the stud 40 at the moment at which the view taking knob 19 is released so that after this return movement of the knob, the stud 42 remains outside the notch 41 of the second feeler as shown in Fig. 5A. Nothing prevents then the film from continuing its progression as required; the drum 26 carring the film engaging teeth is again driven by the film and the stud 42 abuts again inside the notch 41 of the feeler 40 so as to prepare the next view taking.

Furthermore, in the case where the operator may have forgotten to make the film progress after an exposure, it is essential for him to be prevented from shifting again the knob 19 and releasing again the flash light. This result is obtained through a hook 45 sliding over the circular cam 34 rigid with the spindle 32 and provided with a notch 46 (Fig. 5A) inside which the hook 45 drops when the operator releases the control knob 19 so that the arrangement assumes the position illustrated in Fig. 5A. Said hook 45 is operatively connected as a matter of fact with the feeler 39 through a spring 47 which urges said hook into the notch as illustrated in said Fig. 5A. When in contradistinction the film is caused to progress while making the toothed drum progress through one revolution and bringing it into the locking position illustrated in Fig. 5, the feeler 40 and consequently the feeler 39 have rocked through a predetermined angle with reference to their preceding position; consequently a stop 48 carried by said hook 39 has raised the hook 45 and released it with reference to the notch 46. The operator may then actuate again the knob 19 and take a photograph.

The film engages as already mentioned the spindle carrying the take up spool which is provided as well known per se with an arrangement for tensioning permanently the film. When the operator intends recovering the film whether the latter has been exposed wholly or partly, the re-winding is performed in the usual manner. It should be remarked that the film locking means described hereinabove are inoperative when the film is wound rearwardly and connot oppose by any means the re-winding of the film.

The contact controlling the flash light may be provided for instance by an elastic incurved conductive blade 49 as shown in Fig. 5. The sag of said blade increases speedily when the ends of said blade are urged towards each other. Said blade engages through one end the casing and through the other end a stop 50 carried by the feeler 39: the movement of the latter constrains the blade 49 to assume a large curvature; a small shifting of the stop 50 over the feeler 39 produces thus a substantial modification of the sag assumed by the blade, which allows an easy adjustment of the position of the insulated contact piece 51 at the moment at which the flash light is to be released.

Furthermore the operator should be warned that he may release the flash light by the fluctuations of a neon lamp carried by the actual camera in the vicinity of the finder within direct view of the operator, which lamp is not illustrated in the drawing. This lamp is also of interest for warning whether the flash light has actually been operated since it is extinguished immediately after the flash light has been ignited and is iluminated again only when the condensers have been loaded again.

Instead of the feeler system which has just been described, I may resort to a link system of the type illustrated in Figs. 6, 6A and 6B, which produces releasing operations equivalent to those described hereinabove.

In the example illustrated, the rotary support of the prism is rigid with a diametrical blade 53 connected through an elastic member which is not illustrated with a part cylindrical member 52 coaxial with the tube 15 and rigid with the spindle 32 carrying the knob 19. Said part cylindrical member 52 carries a cam 54 the shape of which is readily apparent in Figs. 6A and 6B. Said cam 54 cooperates with a link including an apertured section 55 and a tail piece 56 extending through an opening 57 formed in the tube 15 and engaging the cam 54. Inside the opening 55 in the link is shiftably positioned a stud 42 carried by the toothed drum 46, the opening at 55 having the shape illustrated. As in the preceding case, the blade 53 rigid with the prism carrier is caused to rock between the direct viewing position and the film-projecting position, this rocking movement being provided in the direction of the arrow drawn in Fig. 6 under the action of the elastic drive performed by the member 52 when moving with the knob 19. The elastic system allows executing first as precedingly this rotation through 90°, the continuation of the rotary movement of the member 52 producing then the release of the flash light as provided by an outward movement imparted to the member 73 controlling the flash light. Further, another elastic system returns as precedingly the system 52, 53, 54 into its starting position after control of the flash light upon release of the knob 19.

The cam 54 is given the shape illustrated, i.e. it is comparatively thick and terminates at one end with a point 58 while its other end is notched at 59.

The arrangement described operates as follows:

It is first assumed that the flash light has been ignited and the releasing knob has returned into its starting position. Under the action of two springs 60 and 60' which have a tendency to permanently draw the link 55—56 toward the inside of the tube 15 on the one hand and towards the rear with reference to the plane of the figure on the other hand, the tail-piece 56 of the link engages the notch 59 in the cam as clearly shown in Fig. 6A. In this position the cylindrical member 52 is locked and consequently it is impossible to actuate the prism rocking knob for energizing the flashlight. If, at this moment, the film driving knob is turned, the film will drive in its turn the toothed drum and the stud 42 moves as shown in Fig. 6A along a circular path in the direction illustrated by the dotted arrows. During this movement, it drives gradually the link 55—56 outwardly with reference to the tube 15. Consequently, the tail-piece 56 of said link slides out of the notch and engages then the outer surface of the cam 54 (Fig. 6B). As the movement of the stud 42 continues, the latter occupies the position 42' (Fig. 6B) for which it is wedged inside a corresponding notch in the opening 55.

Since the tail-piece 56 of the link engages now the outer surface of the cam 54, the stud 42 remains locked in this position and it is no longer possible consequently to make the film advance beyond the position occupied by it after it has thus moved through an amount corresponding to the distance between two successive picture areas.

On the other hand, the tail-piece 56 of the link has moved out of the notch 59 and it is possible to actuate the releasing knob. If said knob is then turned through one quarter of a revolution so as to drive the cam 54, the tail-piece of the link moves over the outer surface of said cam 54 in the direction of the arrows drawn in solid lines until it reaches the sharp ridge 58 of said surface and engages the adjacent surface 61 of the cam 54. At this moment and under the action of the springs 60 and 60', said tail-piece slides over said surface 61 of the cam 54. When the knob is released, said tail-piece continues sliding over said surface 61 as illustrated by the arrows and returns finally again inside the notch 59 when the releasing knob has returned into its starting position. In this position, it locks again the releasing knob against movement, and the cycle of operations may begin again.

The apparatus according to the present invention is intended chiefly for medical purposes and it is necessary to provide for asepticization of the apparatus at least by washing it with alcohol. However it is necessary for such a washing that fluidtightness of the apparatus is ensured.

Now, there is a point where conventional cameras risk not being fluidtight and this point is the film winding knob 25. I have provided improved means for ensuring the fluidtightness of such a knob. I have illustrated in Fig. 7 such an improved fluidtight knob. In said figure, the outer knurled knob 62 is rigid with a left-handed threaded member 63. This arrangement rocks round a cylindrical block 64 secured to the wall 65 of the camera and inside it may slide inwardly the spool-engaging element 66 carrying at its front end the teeth 67 adapted to drive the spool 68.

On the other hand, said threaded member 63 engages a corresponding tapping in the element 66 and the enlarged head 69 of the threaded member engages the bottom of the bore in said element 66. The latter is furthermore provided with a plurality of longitudinal slots 70 distributed over its periphery and inside which may enter a projection 71 rigid with the cylindrical block 64. 72 designates a rubber packing adapted to be inserted between the block 54 and the outer knob 62.

This arrangement operates as follows: when drawing outwardly the knob 62, the projection 71 enters one of the corresponding slots. The system including the parts 62, 63 and 66 may then slide and operate in the usual manner so that it is possible to draw out the knob and thus release the spool. Conversely when the knob is urged inwardly home, it becomes rigid with the spool and the slot 70 being disengaged by the projection 71, it is possible to make the spool revolve as desired in the conventional manner.

If it is desired to obtain fluidtightness when washing aseptically the outside of the camera, it is sufficient to draw out the system so that the stud 42 may engage one of the slots 70 while the knob 62 is screwed home anticlockwise so that the latter is locked in a perfectly fluidtight manner.

Obviously, numerous modifications may be brought to the arrangements described hereinabove without unduly widening the scope of the invention as defined in the accompanying claims. In particular the knob 19 may be replaced by a handle of any desired shape.

What I claim is:

1. In a practitioner's endoscopic camera for examination of a patient's body, a tube adapted to engage the patient's body, an optic system inside the outer section of said tube, a flash bulb and an illuminating bulb in the inner section of the tube adapted to illuminate selectively the part of the body to be photographed and to produce an image thereof through the optic system, an eyepiece at the outer end of the tube for examination of the image thus formed, a reflecting surface fitted inside the tube between the eyepiece and the optic system and adapted to rock round an axis perpendicular to the axis of the optic system between a position for which it provides for the passage of the image conveying light beam from the optic system into the eyepiece and a position for which it deflects said beam from the optic system radially with reference to the axis of said optic system through the wall of the tube, a film adapted to move outside the tube in a plane parallel with the axis of the tube across the deflected beam produced by the reflecting surface in its second position, and means for lighting in succession the illuminating bulb and the flash bulb in synchronism with the rocking of the reflecting surface between its first and second positions.

2. In a practitioner's endoscopic camera for examination of a patient's body, a tube adapted to engage the patient's body, an optic system inside the outer section of said tube, a flash bulb and an illuminating bulb in the inner section of the tube adapted to illuminate selectively the part of the body to be photographed and to produce an image thereof through the optic system, an eyepiece at the outer end of the tube for examination of the image thus formed, a reflecting surface fitted inside the tube between the eyepiece and the optic system and adapted to rock round an axis perpendicular to the axis of the optic system between a position for which it provides for the passage of the image conveying light beam from the optic system into the eyepiece and a position for which it deflects said beam from the optic system radially with reference to the axis of said optic system through the wall of the tube, a film adapted to move outside the tube in a plane parallel with the axis of the tube across the deflected beam produced by the reflecting surface in its second position, means for lighting in succession the illuminating bulb and the flash bulb in synchronism with the rocking of the reflecting surface between its first and second positions, and means preventing the lighting of the flash light bulb as long as the reflecting surface is out of its second position.

3. In a practitioner's endoscopic camera for examination of a patient's body, a tube adapted to engage the patient's body, an optic system inside the outer section of said tube, a flash bulb and an illuminating bulb in the inner section of the tube adapted to illuminate selectively the part of the body to be photographed and to produce an image thereof through the optic system, an eyepiece at the outer end of the tube for examination of the image thus formed, a reflecting surface fitted inside the tube between the eyepiece and the optic system and adapted to rock round an axis perpendicular to the axis of the optic system between a position for which it provides for the passage of the image conveying light beam from the optic system into the eyepiece and a position for which it deflects said beam from the optic system radially with reference to the axis of said optic system through the wall of the tube, a film adapted to move outside the tube in a plane parallel with the axis of the tube across the deflected beam produced by the reflecting surface in its second position, means controlling the rotation of the reflecting surface including a control knob and a yielding connection between the reflecting surface and said knob, a stop for the reflecting surface defining the second position of the latter when rocked into said second position, means whereby the movement of the knob beyond the position corresponding to the engagement of the reflecting surface with its stop produces the ignition of the flash bulb, and means elastically returning the knob into the position corresponding to the first position of the reflecting surface.

4. In a practitioner's endoscopic camera for examination of a patient's body, a tube adapted to engage the patient's body, an optic system inside the outer section of said tube, a flash bulb and an illuminating bulb in the inner section of the tube adapted to illuminate selectively the part of the body to be photographed and to produce an image thereof through the optic system, an eyepiece at the outer end of the tube for examination of the image thus formed, a reflecting surface fitted inside the tube between the eyepiece and the optic system and adapted to rock round an axis perpendicular to the axis of the optic system between a position for which it provides for the passage of the image conveying light beam from the optic system into the eyepiece and a position for which it deflects said beam from the optic system radially with reference to the axis of said optic system through the wall of the tube, a film adapted to move outside the tube in a plane parallel with the axis of the tube across the deflected beam produced by the reflecting surface in its second position, means controlling the rotation of the reflecting surface including a control knob and a yielding connection between the reflecting surface and said knob, a stop for the reflecting surface defining the second position of the latter when rocked into said second position, means whereby the movement of the knob beyond the position corresponding to the engagement of the reflecting surface with its stop produces the ignition of the flash bulb, means elastically returning the knob into the position corresponding to the first position of the reflecting surface, means controlling the progression of the film, and means locking the knob in the position corresponding to the first position of the reflecting surface and released by each progression of the film.

5. In a practitioner's endoscopic camera for examination of a patient's body, a tube adapted to engage the patient's body, an optic system inside the outer section of said tube, a flash bulb and an illuminating bulb in the inner section of the tube adapted to illuminate selectively the part of the body to be photographed and to produce an image thereof through the optic system, an eyepiece at the outer end of the tube for examination of the image thus formed, a reflecting surface fitted inside the tube between the eyepiece and the optic system and adapted to rock round an axis perpendicular to the axis of the optic system between a position for which it provides for the passage of the image conveying light beam from the optic system into the eyepiece and a position for which it deflects said beam from the optic system radially with reference to the axis of said optic system through the wall of the tube, a film adapted to move outside the tube in a plane parallel with the axis of the tube across the deflected beam produced by the reflecting surface in its second position, means controlling the rotation of the reflecting surface including a control knob and a yielding connection between the reflecting surface and said knob, a stop for the reflecting surface defining the second position of the latter when rocked into said second position, means whereby the movement of the knob beyond the position corresponding to the engagement of the reflecting surface with its stop produces the ignition of the flash bulb, means elastically returning the knob into the position corresponding to the first position of the reflecting surface, means controlling the progression of the film, means locking the knob in the position corresponding to the first position of the reflecting surface and released by each progression of the film, means locking the means controlling the progression of the film, and means whereby the means controlling the reflecting surface release last mentioned locking means upon engagement of the reflecting surface with its stop.

6. In a practitioner's endoscopic camera for examination of a patient's body, a tube adapted to engage the patient's body, an optic system inside the outer section of said tube, an illuminating bulb in the inner section of the tube adapted to illuminate the part of the body to be photographed and to produce an image thereof through the optic system, an eyepiece at the outer end of the tube for examination of the image thus forced, a reflecting surface fitted inside the tube between the eyepiece and the optic system and adapted to rock round an axis perpendicular to the axis of the optic system between a position for which it provides for the passage of the image conveying light beam from the optic system into the eyepiece and a position for which it deflects said beam from the optic system radially with reference to the axis of said optic system through the wall of the tube, a film adapted to move outside the tube in a plane parallel with the axis of the tube across the deflected beam produced by the reflecting surface in its second position and along a line orthogonal with reference to said axis.

References Cited in the file of this patent

UNITED STATES PATENTS

| 1,159,733 | Akeley | Nov. 9, 1915 |
| 2,006,007 | Zimmer | June 25, 1935 |
| 2,280,561 | Wappler | Apr. 21, 1942 |
| 2,641,977 | Tatsuro Uji et al. | June 16, 1953 |

FOREIGN PATENTS

| 526,644 | Germany | June 8, 1931 |